(12) United States Patent
Kusens

(10) Patent No.: US 11,582,583 B2
(45) Date of Patent: *Feb. 14, 2023

(54) ELECTRONIC LOCATION IDENTIFICATION AND TRACKING SYSTEM WITH BEACON CLUSTERING

(71) Applicant: COLLATERAL OPPORTUNITIES, LLC, College Grove, TN (US)

(72) Inventor: Michael Kusens, Southwest Ranches, FL (US)

(73) Assignee: COLLATERAL OPPORTUNITIES, LLC, Wilmington, DE (US)

( * ) Notice: Subject to any disclaimer, the term of this patent is extended or adjusted under 35 U.S.C. 154(b) by 199 days.

This patent is subject to a terminal disclaimer.

(21) Appl. No.: 17/166,847

(22) Filed: Feb. 3, 2021

(65) Prior Publication Data

US 2021/0235229 A1 Jul. 29, 2021

Related U.S. Application Data

(63) Continuation of application No. 16/655,785, filed on Oct. 17, 2019, now Pat. No. 10,917,749, which is a continuation of application No. 15/996,604, filed on Jun. 4, 2018, now Pat. No. 10,469,995, which is a continuation of application No. 15/698,484, filed on
(Continued)

(51) Int. Cl.
| | |
|---|---|
| *H04W 4/029* | (2018.01) |
| *H04W 64/00* | (2009.01) |
| *H04W 4/60* | (2018.01) |
| *G01S 1/04* | (2006.01) |

(Continued)

(52) U.S. Cl.
CPC ............. *H04W 4/029* (2018.02); *G01S 1/042* (2013.01); *G01S 5/02529* (2020.05); *H04W 4/60* (2018.02); *H04W 64/00* (2013.01); *H04W 84/12* (2013.01)

(58) Field of Classification Search
CPC ......... H04L 29/08108; H04L 29/08657; H04L 29/08936; H04W 4/02; H04W 64/00
See application file for complete search history.

(56) References Cited

U.S. PATENT DOCUMENTS

| | | | | |
|---|---|---|---|---|
| 7,257,411 | B2 * | 8/2007 | Gwon | G01S 5/0268 |
| | | | | 455/226.1 |
| 8,035,508 | B2 * | 10/2011 | Breed | G01S 15/04 |
| | | | | 709/219 |

(Continued)

OTHER PUBLICATIONS

Catarinucci, Luca, et al. "An IoT-aware architecture for smart healthcare systems." IEEE internet of things journal 2.6 (2015): 515-526. (Year: 2015).*

*Primary Examiner* — Sharad Rampuria
(74) *Attorney, Agent, or Firm* — Daniel S. Polley, P.A.

(57) ABSTRACT

A system and method for determining the presence of an individual at a particular spot within a location preferably based on the strength of signals received from beacons assigned to the particular spot by a software application ("App") running on an electronic device of the individual. In one embodiment, certain presence calculations are performed by the App. In another embodiment, the App forwards information regarding the received beacon signals to an electronic identification and location tracking system and the presence calculations are performed by the system.

18 Claims, 7 Drawing Sheets

Related U.S. Application Data

Sep. 7, 2017, now Pat. No. 9,998,857, which is a continuation of application No. 15/238,036, filed on Aug. 16, 2016, now Pat. No. 9,774,991.

(60) Provisional application No. 62/205,833, filed on Aug. 17, 2015.

(51) Int. Cl.
*G01S 5/02* (2010.01)
*H04W 84/12* (2009.01)

(56) References Cited

U.S. PATENT DOCUMENTS

| | | | |
|---|---|---|---|
| 10,917,749 B2* | 2/2021 | Kusens | ............ G01S 5/02529 |
| 2013/0210462 A1* | 8/2013 | Busch | ............ G06Q 30/0205 |
| | | | 455/456.3 |

* cited by examiner

Figure 4: Determination of Presence at Location – Embodiment B

ELECTRONIC LOCATION IDENTIFICATION AND TRACKING SYSTEM WITH BEACON CLUSTERING

This application is a continuation of U.S. application Ser. No. 16/655,785, filed Oct. 17, 2019, which is a continuation of U.S. application Ser. No. 15/996,604, filed Jun. 4, 2018, which is a continuation of U.S. application Ser. No. 15/698,484, filed Sep. 7, 2017, now U.S. Pat. No. 9,998,857, which is a continuation of U.S. application Ser. No. 15/238,036, filed Aug. 16, 2016, now U.S. Pat. No. 9,774,991, which claims the benefit of and priority to U.S. Provisional patent Application Ser. No. 62/205,833, filed Aug. 17, 2015. All applications are incorporated by reference in their entireties for all purposes.

BACKGROUND

Determining accurate indoor locations for people and objects has been the goal of numerous government, academia and corporate institutions for well over a decade. GPS, while excellent for outdoors location, isn't well suited for indoor location due to signal attenuation caused by the building materials causing significant power loss for the signals. Numerous technical approaches to accomplishing the goal of accurate indoor location have been researched, developed and tested though the effectiveness and accuracy of each of these methods can vastly differ.

The industry classifies indoor location technologies into infrastructure-based and infrastructure-free technologies. Infrastructure-based technologies require the installation and configuration of physical beacons, typically based on a radio-frequency technology such as IR, WiFi, RFID and Bluetooth but can also include beacons based on sound, magnetic signals or light. Infrastructure-free technologies, typically utilize the existing infrastructure available in a location such as WiFi access points, cellular/GSM signals, geo-magnetic and sound sources though they usually involve quite a bit of configuration in the form of finger-printing, or the analysis of the specific properties of WiFi, Magnetic, Sound and other signals at various points within the room.

Once the initial infrastructure, fingerprinting, analysis and other implementation steps are done, the various systems currently in existence rely on various forms of signal triangulation, signal measurement, signal disturbance, movement detection, barometric pressure detection, or other forms to detect the location of a person in an indoor space. The technical names for these existing technologies or methods include, but are not limited to, 2.4 Ghz Phase Offset, 2.4 Ghz Time-of-Flight, Ultrasonic Time-of-Flight, IR/Radio Time-of-flight, Modulated Magnetic signals, WiFi+Bluetooth+IMU, WiFi Fingerprinting with Bayesian Filter, WiFi Fingerprinting with Neural Network, WiFi Time-of-Flight with Adaptive filter, WiFi+IMU Fingerprinting and Steerable Antenna Time-of-Flight.

The existing indoor location technologies have performance and accuracy issues related to a variety of factors including but not limited to requiring a line of sight between a persons' device and the beacons/sensors, signal bleed complications, interference from other sources, objects and construction materials, and even the human body acting as a barrier to a signal. Additionally, the overhead in terms of deployment of custom infrastructure, space evaluation, fingerprint analysis, system configuration, equipment costs and other system implementation related issues is relatively high for existing methodologies. The current disclosure is directed at addressing or reducing these issues with indoor location accuracy, performance and overhead with the additional benefit of user identification and tracking throughout a venue.

SUMMARY OF THE DISCLOSURE

A method and system are described that allows for the electronic determination of a person's location in an environment where existing technologies such as GPS are often unable to provide accurate location information. Additionally, the method and system allow for navigational services to be provided to persons, and real-time location determination and location tracking. The disclosed method preferably can work through a system of wireless radio, sound and/or light-based beacons communicating with the customer's smartphone, computer system, or another electronic device of the customer. Wireless radio, sound and/or light-based beacons provide a system with real-time data about the user's whereabouts, allowing for the confirmation and tracking described above and below. Depending on the type of location using the system, in certain circumstances one or more functions of the system may not be needed or available to users and companies alike. As a non-limiting example, where the system is used by a company that provides food and beverage service, a user can place an order for food/beverages and the order delivered to the person at their current location as determined by the system whereas when the system is used by a company which retails consumer products the company may not implement or need this specific feature of the system.

The following non-limiting definitions are provided as an aid in understanding at least a preferred embodiment for the disclosed novel method and system:

| | |
|---|---|
| Electronic Location Identification & Tracking System Database (database) | An electronic database where locations, permissions and user profiles are managed and stored. |
| Electronic Location Identification & Tracking System (system) | A specially programmed electronic or computer system which electronically determines users' locations, presence at locations and departure from locations based on information received from and being in communication with wireless radio, sound and/or light-based beacons. |
| Electronic Location Identification & Tracking System Application (App) | A specially designed software application "App" that is installed on the user's electronic system or device and which allows and directs the user's electronic system or device to communicate with wireless radio, sound and/or light-based beacons in order to identify the user's current location. |
| User | One or more persons who have entered the physical location of an organization who wishes to utilize the location identification and tracking system on their device. |
| System Administrator | One or more persons responsible for entering and maintaining information about each user in the system and database as well as configuring locations and performing beacon management. |
| User's Electronic System or Device | A computer system or electronic device, preferably portable or mobile, including, but not limited to, cell phone, smartphone, key card, tablet, laptop or other computer system belonging to and/or carried/possessed |

| | |
|---|---|
| Wireless Radio, Sound and/or Light-based Beacon | by a user that is specially programmed with the Electronic Location Identification & Tracking System App to permit communication with one or more wireless radio, sound and/or light-based beacons. A small receiver/transmitter capable of operating on short and/or long range wireless communication between electronic devices. Capabilities include, but are not limited to, pinpointing its own location, being programmed or designed to utilize the software in a smart phone, cellular phone or other electronic device to determine that device's location and bi-directional data transmission. Wireless radio, sound and/or light-based beacons can utilize technologies including, but not limited to, Near Field Communication (NFC), Bluetooth, WiFi, Light-Fidelity (LiFi), Magnetic, Ultrasound, InfraRed (IR), and Radio Frequency (RF). All of these technologies and similar current or similar later developed communication technologies are included in the term "wireless radio" wherever that term appears in this disclosure. |
| Device | A smartphone, cellular phone, computer, tablet, laptop or any electronic device with wireless radio, sound and/or light-based beacon communication capability and specifically programmed with the App. |
| Location Cluster | A group of Wireless Radio, Sound and/or Light-based Beacons which as a group are utilized in connection with all members of the group in the determination of a customer's location. The location cluster can consist of one or more beacons, clustered together utilizing the same or different beacon technologies such as NFC, Bluetooth, WiFi, IR, etc. |

DETAILED DESCRIPTION OF DRAWINGS

Figure 1:
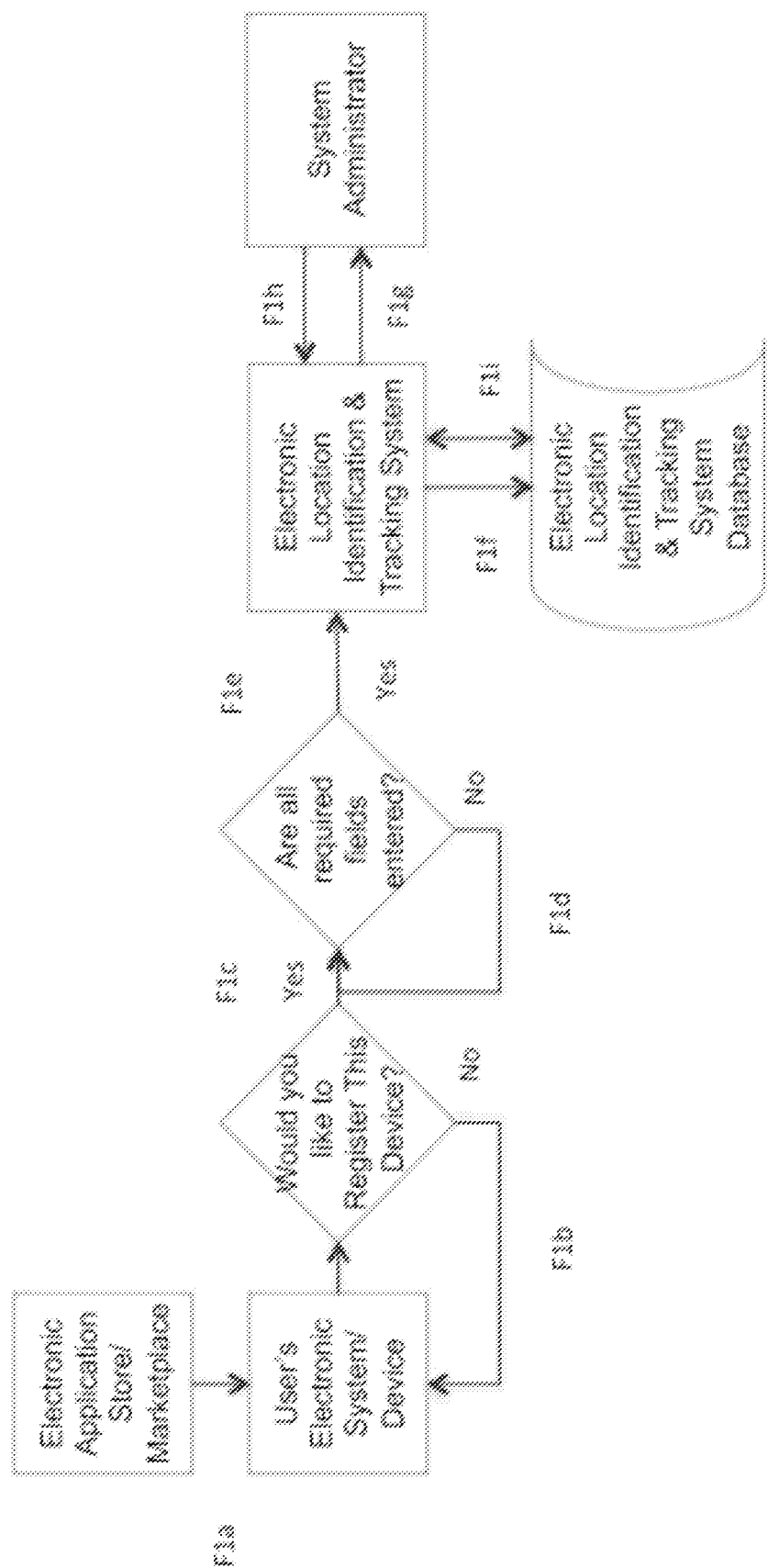
FIG. 1 is a process flow and block diagram illustrating the registration of a customer/user's device in accordance with one embodiment for the disclosed system and method.

FIG. 1 shows one method for allowing a user to register their computer system or device with the electronic location identification and tracking system of or associated with a particular location, company or business. This initial process allows a user to be electronically and automatically tracked within the location, utilize navigation services, order services delivered to their location and receive advertising and other location pertinent and/or aware messaging among other possible uses.

At F1a, a customer downloads and installs the Electronic Location Identification Tracking System Application "App" from their computer or any app store or marketplace including, but not limited to, the Apple App Store, Windows Store and Google Play marketplace. The App is downloaded to the customer's electronic system or device. Alternatively, the customer's electronic device can be purchased or otherwise obtained by the customer with the App already installed/loaded. The App can be a single App per location/company or an App that can work across multiple companies/locations. As a non-limiting example, a hotel chain can have a single app for its customers to use at all of its different locations while a small retail store may choose to have an app for just its single location. Partnerships for multiple companies can also be implemented, where a single App can work seamlessly for all of their stores/establishments.

At F1b, when the App is first opened, it can prompt the user to register their electronic computer system or device with the electronic location identification and tracking system/database. This enables the customer to use their computer system or device to be automatically tracked within the customer's facility, communicate with the company, and order food, beverage or other products/services. Where the customer is interested in ordering food, beverage and/or other products or services, a menu or listing of the food, beverage and other products/services offered at the location can be displayed on the customer's electronic system or device to inform the customer of what is available at the location. If the user opens the App and does not wish to register the device, then the App will operate in a non-registered mode that can also limit the services available on the device.

At F1c, if the customer would like to register the device with the electronic location identification and tracking system, a form will appear on the screen prompting the customer for information, which can include, but is not limited to, one or more of the following: their name, birthday, mailing address, email address, phone number and picture. The system and software can also be designed such that multiple electronic systems and devices are associated with one account so that the rewards given to each electronic system or device are accumulated within one account (i.e. multiple devices belong to a single user can all be used to identify and track that user such as smartphones, smart watches, fitness bands, RFID badges, wearable beacons, wristbands, etc.). The required fields can be selected by the company and can depend on the specific company and needs of that company. The user electronically submits the form when completed.

At F1d, if during submission by the user, the App determines that not all required fields are filled out, it can prompt the customer for the missing information. The user can resubmit the form with the missing information provided.

At F1e, once all required fields are provided and the form is electronically submitted by the user, the data is electronically sent to and received by the electronic location identification and tracking system.

At F1f, the electronic location identification and tracking system stores the user's form submissions along with some identifying information for the user's device such as, but not limited to, one or more of the following: the device's name and/or device's owner's name, a universally unique identifier or UUID (an identifier standard used in software construction and is a 128-bit value), media access control address or MAC address (unique identifier assigned to network interfaces for communications on the physical network segment), IP Address, or other unique identifiers.

At F1g, an electronic notification can be sent to the system administrator(s) via email, sms, mms, voice, fax or other electronic method of the new user registration.

At F1h, the system administrator can access the electronic location identification and tracking system to view and edit the new customer's profile. The system administrator can assign the user to any group or list available, or add information about the user in its profile.

At F1i, any edits or additions to the user's profile made by the system administrator can be stored in the electronic location identification and tracking system database.

Figure 2:
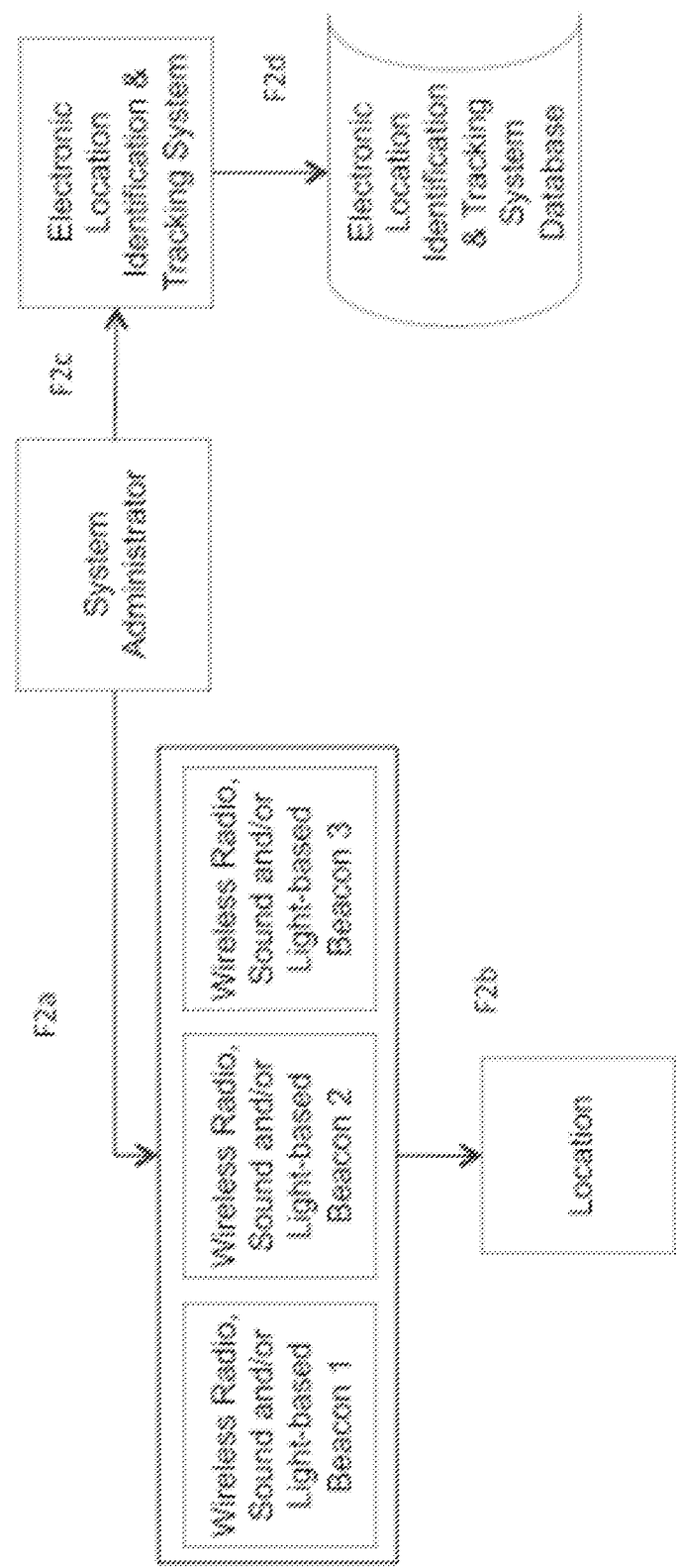
FIG. 2 is a process flow and block diagram illustrating the registration of a beacon or cluster of beacons location in accordance with one embodiment for the disclosed system and method.

FIG. 2 illustrates how a location is registered with the electronic location identification and tracking system.

At F2a, a system administrator configures either a single or cluster of wireless radio, sound and/or light-based beacon(s) with information including, but not limited to, one more of the following: its name, unique identifier (MAC Address, UUID or similar), group/organization, unique number within an organization, location, wireless networks, etc. A cluster of beacons is created when two or more beacons are grouped together to define a single location and can include different types and technologies of beacons. As non-limiting examples, a beacon cluster may consist of 3 bluetooth beacons and a LiFi beacon in one location but consist of 2 bluetooth beacons and an Ultrasonic beacon in another location. The system administrator can select various options with regards to what the system should do when it does not receive a signal from a beacon assigned to a given location cluster. Options include but are not limited to discarding this location from presence determination if a signal from all beacons configured for the cluster is not received, assigning a default or static value for the beacon signal strength for any beacon that is assigned to this cluster but the system didn't receive a signal from, or ignoring the beacon from consideration in presence determination. Location determination for a cluster of beacons can be preferably based on an average of the signal strength received by a device from all of the beacons assigned to a given cluster of a location and subject to the options specified above for any missing signals. Preferably, the clustering method can be designed to enable micro-location services (i.e. be able to provide accurate location at a sub-room level). In one non-limiting example, the distances of the clusters can range from about a few feet radius to about a 15 feet radius. The beacons can be placed anywhere from right next to or adjacent to each other up to a few feet apart, depending on the level of accuracy needed for the given use. Clusters can be defined from a logical perspective as a specific location. From a technical perspective, the beacon clusters can, as a non limiting example, be defined by using their UUID, Major and Minor values (identifiers). All beacons in a cluster preferably having the same UUID and Major value, with each beacon in the cluster having a unique minor value, though this is not considered limiting and other value configurations can be used.

At F2b, the configured wireless radio, sound and/or light-based beacon(s) are physically installed at the configured location and can be tested to ensure its operability.

At F2c, a system administrator then electronically accesses the electronic location identification and tracking system to enter in the installed wireless radio, sound and/or light-based beacon(s)' configuration and location information. Beacon clusters can be defined at this point as well. When a location is created, the user inputs the number of beacons used to define that specific location. When a cluster of beacons is configured for a location, the system will use the average of the received signal strengths for all beacons in a cluster in determining location or presence at a location. As a non-limiting example, if a location is configured for a cluster of 3 beacons, the signal strength received from each of the beacons is averaged to create a single location signal strength value. Optionally, should a beacon signal not be received for any given beacon assigned to a location cluster, the system can either assign a dummy value to this beacon signal or choose to ignore all beacons for this location. Additional configuration of the beacon(s) can also be performed at this step, which can include, but is not limited to, configuring notification settings, signal types, signal strengths, transmission power and device presence durations.

At F2d, the wireless radio, sound and/or light-based beacon's configuration and location information is stored in the electronic location identification and tracking system database.

Figure 3:
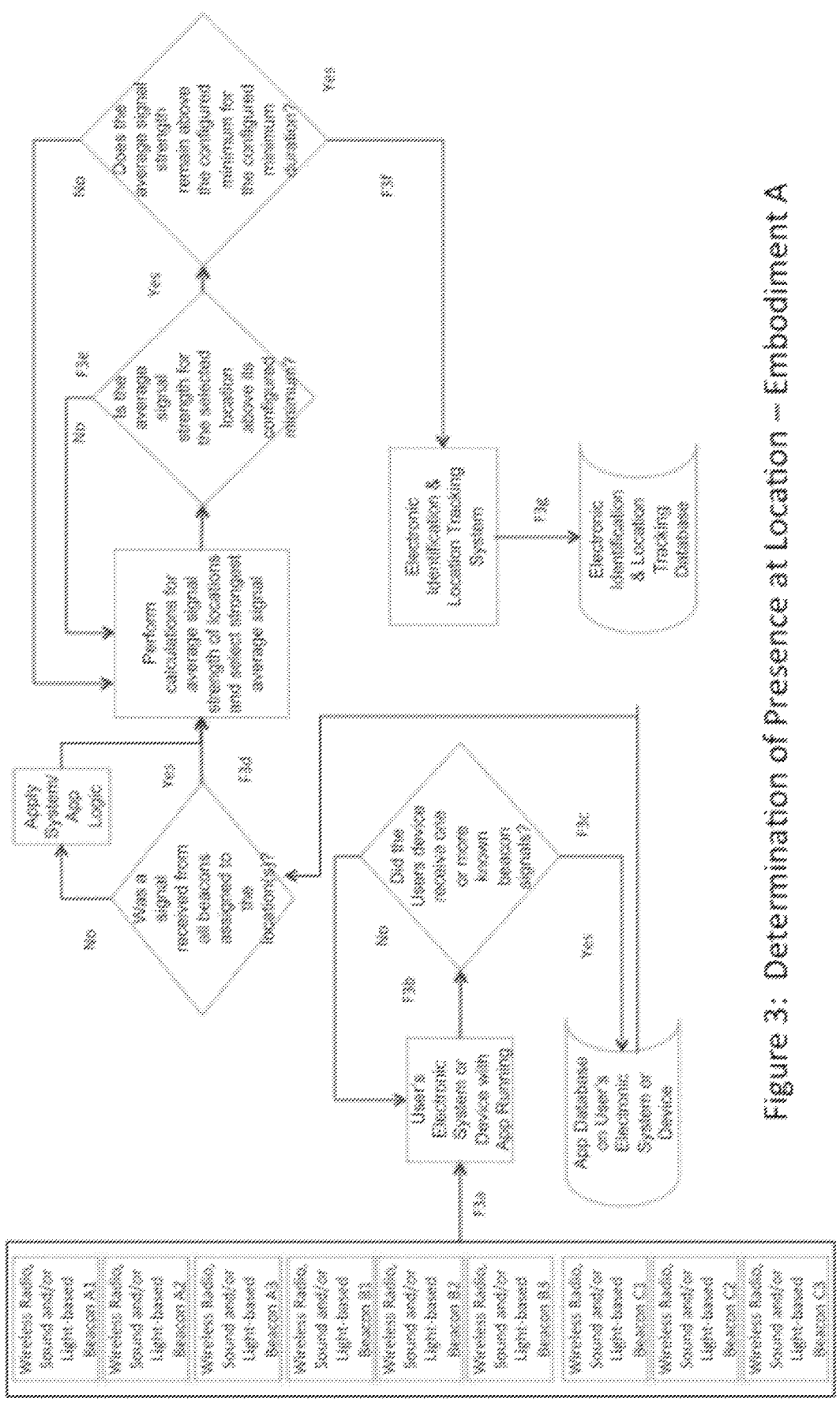
FIG. 3 is a process flow and block diagram illustrating a first embodiment for determining a customer's presence at location by the disclosed system and method.

FIG. 3 illustrates one embodiment of how the system determines the location of a user and their presence at any given location based on their registered device.

At F3a, the wireless radio, sound and/or light-based beacons installed at various locations are preferably constantly and automatically broadcasting their information including, but not limited to, one or more of the following: its name, unique identifier (MAC Address, UUID or similar), group/organization, unique number within an organization, location, wireless networks, etc.

At F3b, the user's electronic system or device with the electronic identification and location tracking system application "App" downloaded and running (either in the foreground or as a background service) receives the broadcasted information from the wireless radio, sound and/or light-based beacons including, but not limited to, one or more of the following: its name, unique identifier (MAC Address, UUID or similar), group/organization, signal type and strength. If the beacon contains a recognized identifier as programmed into the App, it proceeds to step F3c. Otherwise, the App will continue to monitor for known beacon signals and ignore any other beacons present that are not registered or designed to be used with the system. This process repeats at configurable intervals so that the App can be frequently receiving beacon information.

At F3c, when a known beacon signal is received by the App, its database is queried to determine the location properties of the known beacon whose signal was received. This will include but is not limited to the type and number of beacons associated with the location assigned to the particular beacon.

At F3d, the User/Customer's system/App ("system/App") makes a determination based on the information returned in F3c if a signal was received from all beacons assigned to a location or locations, if multiple beacons are discovered. If signals from all beacons assigned to a location are received, the system proceeds to step F3e. If a signal was not received from all beacons in a location cluster, the system/App applies the programmed and configured logic for handling the missing beacons. This may include, but is not limited to, ignoring the location in its entirety if all beacons are not found, using a static value for the missing beacons or simply ignoring the missing beacons and calculate the average using just the beacons whose signals were received.

At F3e, if the analysis performed in F3d indicates that the user's device is near a given location, the system/App determines whether the device is in close enough proximity to the beacons to be considered present at that specific area of a location. It does this by comparing the average signal strength received for the beacons at the location to the configured minimum. If the average signal strength is below the configured value, the system will continue to perform the average signal strength calculations in F3d. If the average signal strength is above the configured minimum value, the system proceeds to step F3f. This step can be optional and the system can be configured to simply determine a user's location based on the highest average signal strength value from the beacon clusters.

At F3f, the system/App begins counting to see if the user's device with the app running is maintaining its average signal strength for longer then a configured duration for that location. If the average signal strength for the location cluster fails to remain above the configured minimum threshold for greater then a configured period of time, the system will continue to perform the average signal strength calculations in F3d. If the system/App determines that the average signal strength for a location cluster is maintained above a configured threshold for longer then a configured period of time, then it will notify the Electronic Identification & Location Tracking system of the user's confirmed presence at the given location.

At F3g, the electronic identification & location tracking system stores the user's location and other information in its database.

Figure 4:
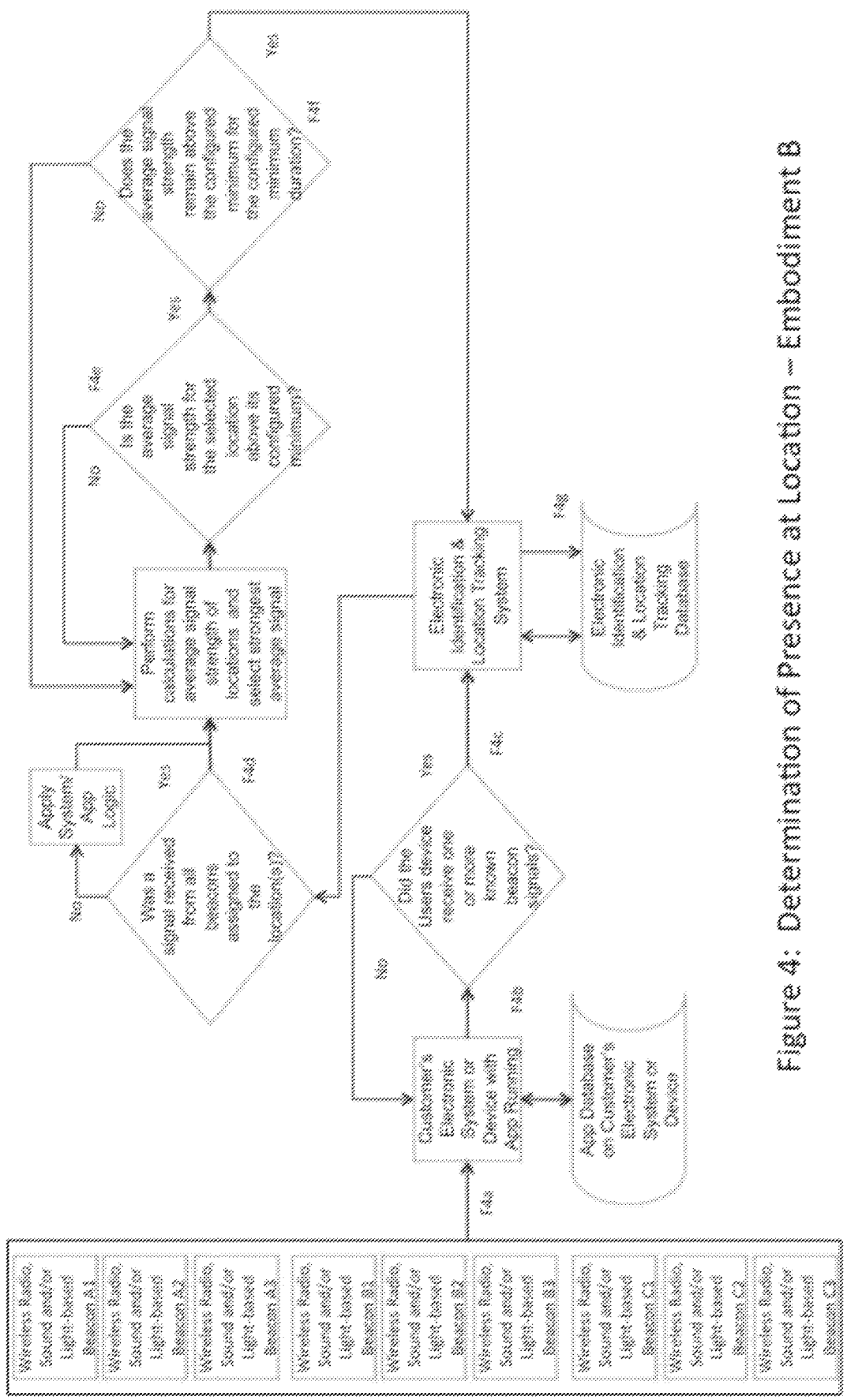
FIG. 4 is a process flow and block diagram illustrating a second embodiment for determining a customer's presence at location by the disclosed system and method.

FIG. 4 illustrates another embodiment of how the system determines the location of a user and their presence at any given location based on their registered device.

At F4a, the wireless radio, sound and/or light-based beacons installed at various locations are constantly and automatically broadcasting their information including, but not limited to, one or more of the following: its name, unique identifier (MAC Address, UUID or similar), group/organization, unique number within an organization, location, wireless networks, etc.

At F4b, the user's electronic system or device with the electronic identification and location tracking system application "App" downloaded and running (either in the foreground or as a background service) receives the broadcasted information from the wireless radio, sound and/or light-based beacons including, but not limited to one or more of the following: its name, unique identifier (MAC Address, UUID or similar), group/organization, signal type and strength. If the beacon contains a recognized identifier as programmed into the App, it proceeds to step F4c. Otherwise, the App will continue to monitor for known beacon signals. This process repeats at configurable intervals so that the App can be frequently receiving beacon information.

At F4c, when a known beacon signal is received by the system/App, it sends the information received from the beacon including but not limited to, one or more of the following: its name, unique identifier (MAC Address, UUID or similar), group/organization, signal type and strength to the electronic identification and location tracking system. The electronic identification and location tracking system queries its database to determine the location properties of the known beacon whose signal was received. This can include, but is not limited to, the type and number of beacons associated with the location assigned to the particular beacon and the configured logic for what to do when the system doesn't receive a signal from one or more beacons (or type of beacons) in a location cluster.

At F4d, the electronic identification and location tracking system makes a determination based on the information returned in F4c if a signal was received from all beacons assigned to a location or locations, if multiple beacons are discovered. If signals from all beacons assigned to a location are received, the system proceeds to step F4e. If a signal was not received from all beacons in a location cluster, the system applies the programmed and configured logic for handling the missing beacons. This may include, but is not limited to, ignoring the location in its entirety if all beacons are not found, using a static value for the missing beacons or simply ignoring the missing beacons and calculate the average using just the beacons whose signals were received.

At F4e, if the analysis performed in F4d indicates that the user's device is near a given location, the system/App determines whether the device is in close enough proximity to the beacons to be considered present at that specific area of a location. It does this by comparing the average signal strength received for the beacons at the location to the configured minimum. If the average signal strength is below the configured value, the system will continue to perform the average signal strength calculations in F4d. If the average signal strength is above the configured minimum value, the system proceeds to step F4f. This step can be optional and the system can be configured to simply determine a user's location based on the highest average signal strength value from the beacon clusters.

At F4f, the system/App begins counting to see if the user's device with the app running is maintaining its average signal strength for longer then a configured duration for that location. If the average signal strength for the location cluster fails to remain above the configured minimum threshold for greater then a configured period of time, the system will continue to perform the average signal strength calculations in F4d. If the system determines that the average signal strength for a location cluster is maintained above a configured threshold for longer then a configured period of time, then it will notify the Electronic Identification & Location Tracking system of the user's confirmed presence at the given location.

At F4g, the electronic identification & location tracking system stored the user's location and other information its database.

Figure 5:
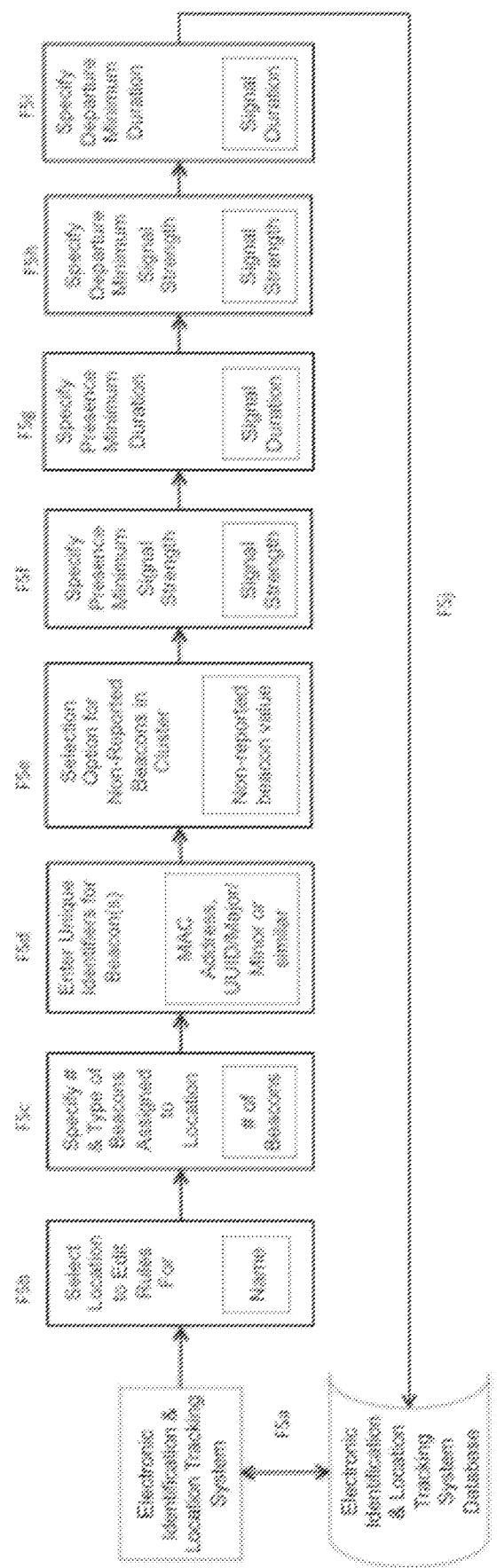
FIG. 5 is a process flow and block diagram of a location rules engine in accordance with one embodiment for the disclosed system and method.

FIG. 5 demonstrates how a user's presence at a location is determined and configured within the electronic identification & location tracking system. This process can also be utilized to edit presence determination configurations already stored in the database.

At F5a, the electronic identification & location tracking system queries the electronic identification & location tracking system database for a list of available locations. Available locations can be ones that are entered into the system database as described above. Configuring refers to setting parameters for a location to assign a beacon or beacon cluster to a particular location as well as to aid in the determination of a customer/user's presence at that location based on signal strength and duration. This function can be typically reserved for a system administrator.

At F5b, the electronic identification & location tracking system displays a listing of available locations to configure. The system administrator can then select the location to configure or edit the configuration of. Reconfiguring the location can be for a variety of reasons, such as, but not limited to, adding additional beacons to a location cluster for better accuracy, replace a beacon that is faulty, or changing the presence determination criteria to make the system more or less sensitive/accurate. The system administrator may also elect to configure a new location in the manner.

At F5c, once the location is selected, the system administrator may now specify the number and type of beacons assigned to this particular location. A location can consist of one or more beacons, clustered together (i.e. where more than one beacon designated for the location) utilizing the same or different technologies. As a non-limiting example, a beacon cluster can consist of three beacons made up of IR, Bluetooth and Ultrasonic beacons that work in conjunction.

At F5d, next, the system administrator may now specify the Unique Identifiers for the beacons to be identified with this location. As a non-limiting example, if three beacons are configured for this location cluster, then 3 beacon identifiers should be selected to belong to this location cluster. If only a single beacon is selected then a single unique identifier is assigned to this location. Locations can be identified by using matching identifiers on the beacons with only a single differentiator. In one non-limiting embodiment, 3 identifying fields can be used for each beacon, UUID, Major Value and Minor Value. Each beacon can have values assigned to each of those 3 fields. As a non-limiting example, a 3 beacon cluster could have each beacon with a UUID of 121324-34235-342345-34423 and a major id value of 12345. Then beacon 1 in the cluster could have a minor value of 1, beacon 2 could have a minor value of 2 and beacon 3 could have a minor value of 3. The next cluster could have 3 beacons with the same UUID as above but with a different major value and a similar minor value structure as the previous location.

At F5e, next, the system administrator may now select what the system should do when it does not receive a signal from a beacon assigned to a given location cluster. Options can include, but are not limited to, discarding this location from presence determination if a signal from all beacons configured for the cluster is not received, assigning a default or static value for the beacon signal strength for any beacon that is assigned to this cluster but didn't receive a signal, or ignoring the beacon from consideration in presence determination.

At F5f, next, the system administrator may now specify the minimum signal strength threshold for a user to be considered present at this particular location. This signal strength is the measure of the strength of a known wireless radio, sound and/or light-based beacons transmitted signal strength as received by the customer's electronic system or device. As a non-limiting example, the signal strength can be measured and calculated on a scale of 0 to 100% where the minimum signal strength threshold is set to 80%. This means that unless the customer's device receives a signal from the wireless radio, sound and/or light-based beacons greater then the 80% strength threshold, they will not be considered present at a location. Though it is preferred that the beacons are of the same type for a particular cluster, it is within the scope of the disclosure to have a location cluster made up beacons of differing types (i.e. Bluetooth beacon, a light-based beacon and a sound based beacon). The signal strength measurement is intended to approximate the distance between the user's electronic system or device and the wireless radio, sound and/or light-based beacons and can also include strength indicators including but not limited to RSSI (relative signal strength indicator) values. This setting can be optional.

At F5g, once the minimum presence signal strength threshold has been entered, the system administrator has the option of specifying the minimum presence duration for that location. The minimum presence duration can be a time value and can be expressed in any known and acceptable time format including but not limited to milliseconds, seconds, minutes and hours. As a non-limiting example, the system administrator can configure the value to 20 seconds. In this instance the user's electronic system or device must report to the electronic identification & location tracking system a signal strength above the minimum threshold specified in F5f for a period of at least 20 consecutive seconds in order to consider the user's electronic system or device present at that location. This setting can be optional.

At F5h next, the system administrator may now specify the signal strength threshold for a user to be considered to have departed from this particular location. This signal strength is the measure of the strength of a known wireless radio, sound and/or light-based beacons transmitted signal strength as received by the customer's electronic system or device. As a non-limiting example, the signal strength can be measured and calculated on a scale of 0 to 100% where the maximum signal strength threshold is set to 40%. This means that once the customer's device receives a signal from the wireless radio, sound and/or light-based beacons lower then the 40% strength threshold, they will not be considered present at a location. The signal strength measurement is intended to approximate the distance between the users electronic system or device and the wireless radio, sound and/or light-based beacons and can also include strength indicators including but not limited to RSSI (relative signal strength indicator) values. This setting can be optional. As a non-limiting example, signal strength can be measured in terms of decibels or RSSI. For decibels, the receiving device (phone, tablet, etc) can simply measure the signal strength in db. Also, a fixed value can be configured for the transmit power strength of the beacons and that power level (in db) can be used in the calculation of the RSSI which is an industry standard measurement algorithm that factors in the received signal strength in db and compares it against the known transmit power. Other potential forms of signal strength measurement that can be used include, but are not limited to Lux (light levels for light-based beacons), decibels in terms of volume (sound based-beacons) and magnetic fields strength.

At F5i, once the departure signal strength threshold has been crossed, the system administrator has the option of specifying the minimum departure duration for that location. The minimum departure duration is a time value and can be expressed in any known and acceptable time format including, but not limited to, milliseconds, seconds, minutes and hours. As a non-limiting example, the system administrator can configure the value to 20 seconds. In this instance the user's electronic system or device reports to the electronic identification & location tracking system a signal strength below the threshold specified in F5h for a period of at least 20 consecutive seconds in order to consider the user's electronic system or device to have departed that location. This setting can be optional.

At F5j, the locations presence determination configuration profile can be updated in the electronic identification & location tracking system database.

Figure 6:
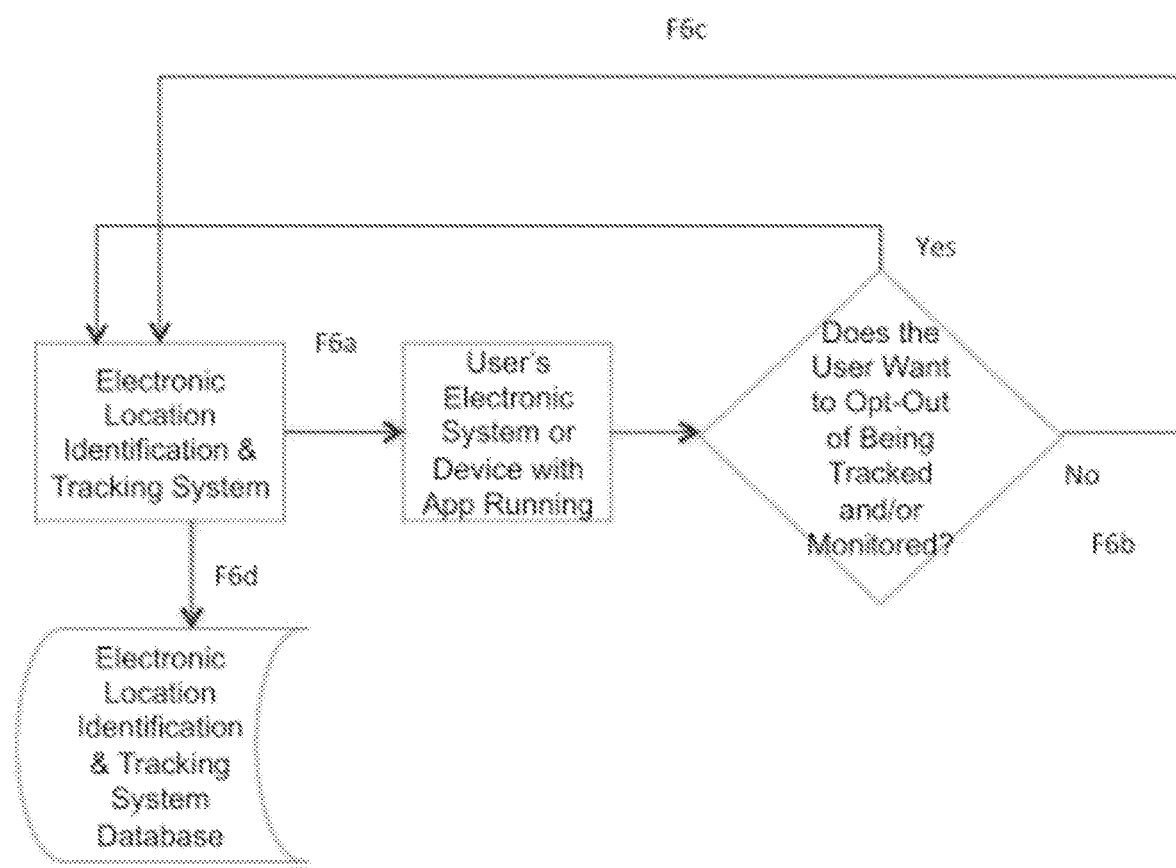
FIG. 6 is a process flow and block diagram illustrating a user/customer opt-out of tracking/monitoring by a company/facility in accordance with one embodiment for the disclosed system and method.

FIG. 6 demonstrates how a customer is able to opt-out of being tracked/monitored from within the electronic identification & location tracking system application on the user's electronic system or device.

At F6a, when the electronic identification & location tracking system makes a determination that a user's electronic system or device is present at a given location as described in FIGS. 3 and/or 4, a notification can be sent to the user's electronic system or device via the electronic identification & location tracking system application "App" indicating that their presence has been detected at a given location by the electronic identification & location tracking system. The notification can be made through a variety of methods including but not limited to Email, SMS, MIMS, On Screen and Voice.

At F6b, the customer through the App running on their electronic system or device is presented with or can select a menu item to opt-out of being tracked/monitored by the facility. If the customer does not make an affirmative selection to opt-out of being tracked/monitored or makes an affirmative selection to allow tracking/monitoring, then the electronic identification & location tracking system is electronically notified so that user tracking/monitoring can continue.

At F6c, if the user makes an affirmative selection to Opt-Out of being tracked/monitored, then the electronic identification & location tracking system is electronically notified of such selection.

At F6d, the electronic identification & location tracking system updates the electronic identification & location tracking system database of the users' selection in F6b or F6c.

Figure 7:
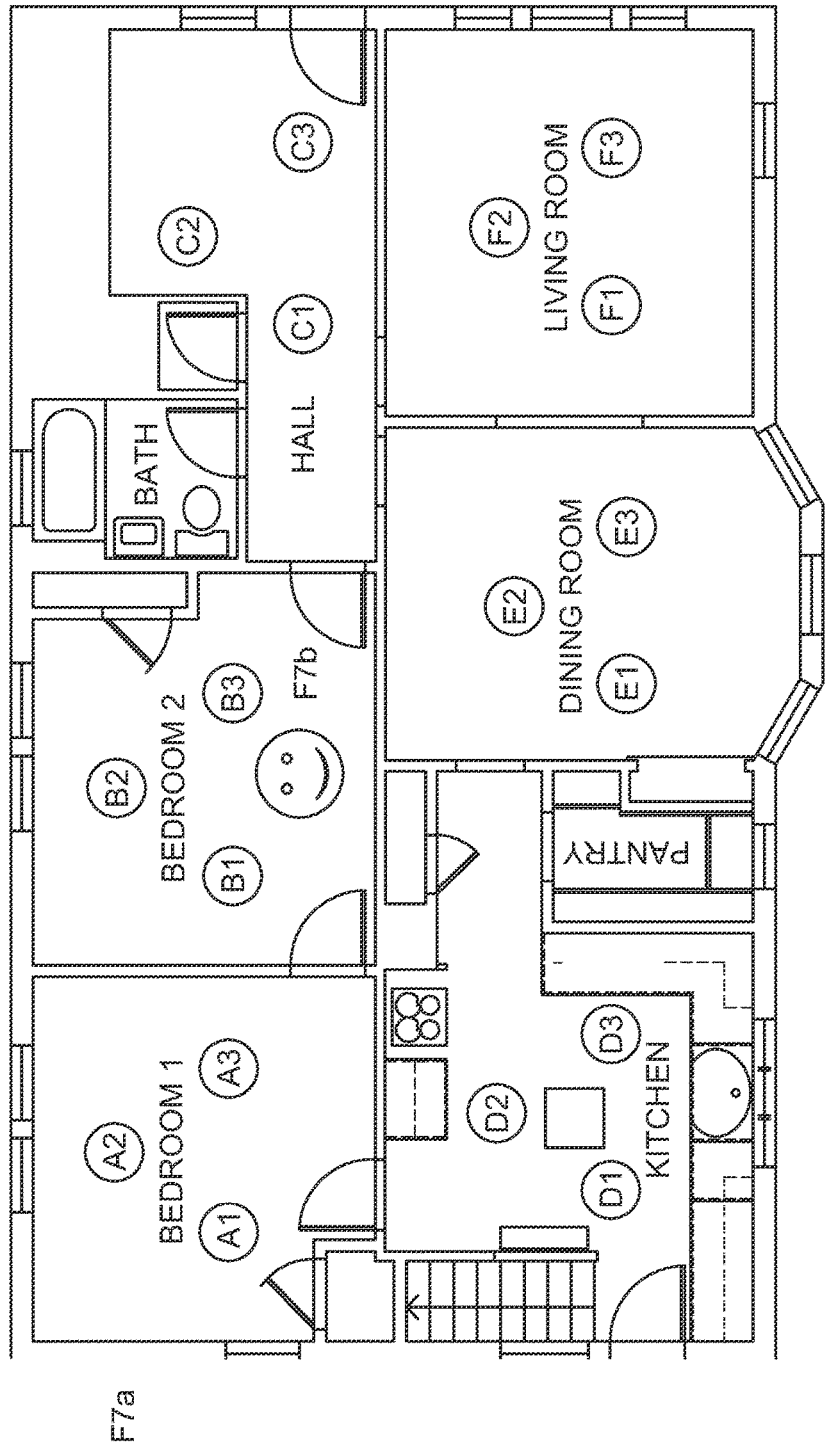
FIG. 7 illustrates a non-limiting sample of a customer presence determination using beacon clustering at a location in accordance with one embodiment for the disclosed system and method.

FIG. 7 demonstrates one non-limiting embodiment/example of how a cluster of beacons can be assigned to a location and used for location determination within the electronic identification & location tracking system.

At F7a, beacons are installed and configured for six locations, Bedroom 1 ('A' Beacons), Bedroom 2 ('B' Beacons), Hall ('C' Beacons), Kitchen ('D' Beacons), Dining Room ('E' Beacons) and Living Room ('F' Beacons). Though not limiting, each location has 3 beacons configured in the cluster.

At F7b, a user with the electronic identification & location tracking system application "App" on the users' electronic system or device enters Bedroom 2 ('B' Beacons) as illustrated.

At F7c, the electronic identification & location tracking system application "App" on the user's electronic system or device receives beacon signals from all nearby beacons and sends them to the electronic identification & location tracking system. As a non-limiting example, the signal strength measurements for each beacon are displayed in the chart on the figure. Also seen in the chart for F7c is the signal average for each location/beacon cluster calculated by the electronic identification & location tracking system, which can be all of the beacon signal strengths received for each location.

At F7d, the electronic identification & location tracking system makes a determination the user's location of Bedroom 2 ('B' Beacons) based on a higher average signal strength received from the beacons in the Bedroom 2 location cluster then the average signal strength received from the beacons in the other location clusters.

The system that performs the above described functions and steps can include several components including, but not necessarily limited to, the following:

1. One or more Wireless Radio, Sound and/or Light-based Beacon(s)
2. One or more user/customer electronic computer system or device(s)
3. Electronic Identification & Location Tracking System
4. Electronic Identification & Location Tracking System Application "App"
5. Electronic Identification & Location Tracking System Database
6. Electronic Identification & Location Tracking System Application "App" Database
7. A public or private computer network to connect or communicate the user's device, beacons and Electronic Identification & Location Tracking System and database with each other.

The various components can be in electrical and wireless communication with each other.

The ability to electronically identify users, track user movements and identify presence at a location can provide significant administrative and financial benefits incident to operators of venues where traditional GPS location services are not available. Without limitation, these include the following benefits:

1. Provide venue operators the ability to identify a user and the user's precise location within their facility.
2. Provide venue operators the ability to determine a user's presence at a location through configurable parameters.
3. Provide venue operators with product and/or service delivery capabilities to a user's real-time location.
4. Provide users with real-time mapping and navigation in buildings and other venues.

It should be understood that the exemplary embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from their spirit and scope.

All components of the described system and their locations, electronic communication methods between the system components, electronic storage mechanisms, etc. discussed above or shown in the drawings, if any, are merely by way of example and are not considered limiting and other component(s) and their locations, electronic communication methods, electronic storage mechanisms, etc. can be chosen and used and all are considered within the scope of the disclosure.

Unless feature(s), part(s), component(s), characteristic(s) or function(s) described in the specification or shown in the drawings for a claim element, claim step or claim term specifically appear in the claim with the claim element, claim step or claim term, then the inventor does not consider such feature(s), part(s), component(s), characteristic(s) or function(s) to be included for the claim element, claim step or claim term in the claim when and if the claim element, claim step or claim term is interpreted or construed. Similarly, with respect to any "means for" elements in the claims, the inventor considers such language to require only the minimal amount of features, components, steps, or parts from the specification to achieve the function of the "means for" language and not all of the features, components, steps or parts describe in the specification that are related to the function of the "means for" language.

The benefits, advantages, solutions to problems, and any element(s) that may cause any benefit, advantage, or solution to occur or become more pronounced are not to be construed or considered as a critical, required, or essential features or elements of any or all the claims.

While the disclosure has been described and disclosed in certain terms and has disclosed certain embodiments or modifications, persons skilled in the art who have acquainted themselves with the disclosure, will appreciate that it is not necessarily limited by such terms, nor to the specific embodiments and modification disclosed herein. Thus, a wide variety of alternatives, suggested by the teachings herein, can be practiced without departing from the spirit of the disclosure, and rights to such alternatives are particularly reserved and considered within the scope of the disclosure.

What is claimed is:

1. An electronic system for determining a presence of a person at a particular area within a geographical location, comprising:
   a location identification and tracking computer system application ("App") running on a portable electronic device on the person of an individual located within the location; and
   a plurality of wireless beacons disposed at different areas within a geographical location, each of the plurality of wireless beacons transmitting a wireless signal for receipt by the App when the portable electronic device is within range of the wireless signal,
   wherein each signal transmitted by each wireless beacon contains a unique identifier identifying the wireless beacon who transmitted the signal, wherein the App includes instructions to allow the App to electronically determine whether each beacon signal received is from a beacon whose unique identifier is previously programmed into the App;
   wherein the App includes instructions so that for each known beacon signal received by the App, the App electronically queries a database to electronically receive location properties for each known beacon,
   wherein the location properties include information on the identity of beacons grouped as a particular cluster of beacons for a particular area within the location; and
   wherein the App includes instructions to allow the App to electronically determining a current area of presence for the individual at the location based on determining which cluster of beacons out of a plurality of cluster of beacons for the location has a highest average signal strength.

2. The electronic system for determining a presence of a person of claim 1 wherein the unique identifier for each beacon in a particular beacon cluster includes a universally unique identifier ("UUID"), a major value identifier and a minor value identifier, wherein the unique identifier for each beacon is stored in the database.

3. The electronic system for determining a presence of a person of claim 2 wherein the unique minor value identifier distinguishes one beacon in the particular beacon cluster from the remaining beacons in the particular beacon cluster.

4. The electronic system for determining a presence of a person of claim 1 wherein the App includes instructions such that when a signal is received from each beacon associated with a particular cluster of beacons the App (a) determines or obtains a signal strength for each beacon signal received, (b) electronically determines an average signal strength from all of the signal strengths received, and (c) electronically compares the average signal strength to a preconfigured minimum signal strength value for the particular area or particular cluster of beacons.

5. The electronic system for determining a presence of a person of claim 4 wherein the App includes instructions such that if the determined average signal strength is above the preconfigured minimum signal strength value the App considers the individual present at the particular area within the location associated with the particular cluster of beacons.

6. The electronic system for determining a presence of a person of claim 5 wherein the App includes instructions to require the average signal strength to be above the preconfigured minimum signal strength value for a preconfigured period of time before considering the individual present at the particular area within the location associated with the particular cluster of beacons.

7. The electronic system for determining a presence of a person of claim 1 wherein the App includes instructions to allow the App to electronically determine if a signal was received from each beacon associated with the particular cluster of beacons.

8. The electronic system for determining a presence of a person of claim 7 wherein if a signal was not received from each beacon associated with the particular cluster of beacons the App includes instructions to either (i) use a static value for the missing beacon(s) when calculating an average signal strength for the beacon signals of the beacons associated with the particular cluster of beacons, or (ii) calculate the average signal strength from the beacon signals received from the beacons associated with the particular cluster of beacons.

9. The electronic system for determining a presence of a person of claim 1 further comprising the step of storing a determined location for the user in the database.

10. An electronic system for determining a presence of a person at a particular area within a geographical location, comprising:
    a location identification and tracking computer system application ("App") running on a portable electronic device on the person of an individual located within the location
    a plurality of wireless beacons disposed at different areas within a geographical location, each of the plurality of wireless beacons transmitting a wireless signal for receipt by the App when the portable electronic device is within range of the wireless signal, wherein each signal transmitted by each wireless beacon contains a unique identifier identifying the wireless beacon who transmitted the signal,
    an identification and location tracking system in wireless communication with the portable electronic device that the App is running on;
    an identification and location tracking database in electronic communication with the identification and location tracking system, the identification and locating tracking system programmed to electronically determine whether each beacon signal received by the App is from a beacon whose unique identifier is previously stored in the identification and location tracking database;
    wherein for each known beacon signal received by the App the identification and location tracking system is programmed to electronically query the database to receive location properties for each known beacon, wherein the location properties include information on the identity of beacons grouped as a particular cluster of beacons for a particular area within the location; and
    wherein the identification and location tracking system is programmed to electronically determine a current area of presence for the individual at the location based on determining which cluster of beacons out of a plurality of cluster of beacons for the location has a highest average signal strength.

11. The electronic system for determining a presence of a person of claim 10 wherein the unique identifier for each beacon in a particular beacon cluster includes a universally unique identifier ("UUID"), a major value identifier and a minor value identifier, wherein the unique identifier for each beacon is stored in the database.

12. The electronic system for determining a presence of a person of claim 11 wherein the unique minor value identifier distinguishes one beacon in the particular beacon cluster from the remaining beacons in the particular beacon cluster.

13. The electronic system for determining a presence of a person of claim 10 wherein when a signal is received from each beacon associated with a particular cluster of beacons the identification and location tracking system is programmed to (a) determine or obtain a signal strength for each beacon signal received, (b) electronically determine an average signal strength from all of the signal strengths received, and (c) electronically compare the average signal strength to a preconfigured minimum signal strength value for the particular area or particular cluster of beacons.

14. The electronic system for determining a presence of a person of claim 13 wherein if the determined average signal strength is above the preconfigured minimum signal strength value the identification and location tracking system is programmed to consider the individual present at the particular area within the location associated with the particular cluster of beacons.

15. The electronic system for determining a presence of a person of claim 14 wherein the identification and location tracking system is programmed to require the average signal strength to be above the preconfigured minimum signal strength value for a preconfigured period of time before considering the individual present at the particular area within the location associated with the particular cluster of beacons.

16. The electronic system for determining a presence of a person of claim 10 wherein the identification and location tracking system is programmed to electronically determine if a signal was received from each beacon associated with the particular cluster of beacons.

17. The electronic system for determining a presence of a person of claim 16 wherein if a signal was not received from each beacon associated with the particular cluster of beacons the identification and location tracking system is programmed to either (i) use a static value for the missing beacon(s) when calculating an average signal strength for the beacon signals of the beacons associated with the particular cluster of beacons, or (ii) calculate the average signal strength from the beacon signals received from the beacons associated with the particular cluster of beacons.

18. The electronic system for determining a presence of a person of claim 10 further comprising the step of storing a determined location for the user in the identification and location tracking database.

* * * * *